3,199,382
REAMER WITH REINFORCED
COOLED SHANK
Rudolf W. Andreasson, P.O. Box 174, Birmingham, Mich.
Filed Dec. 26, 1962, Ser. No. 247,170
1 Claim. (Cl. 77—72)

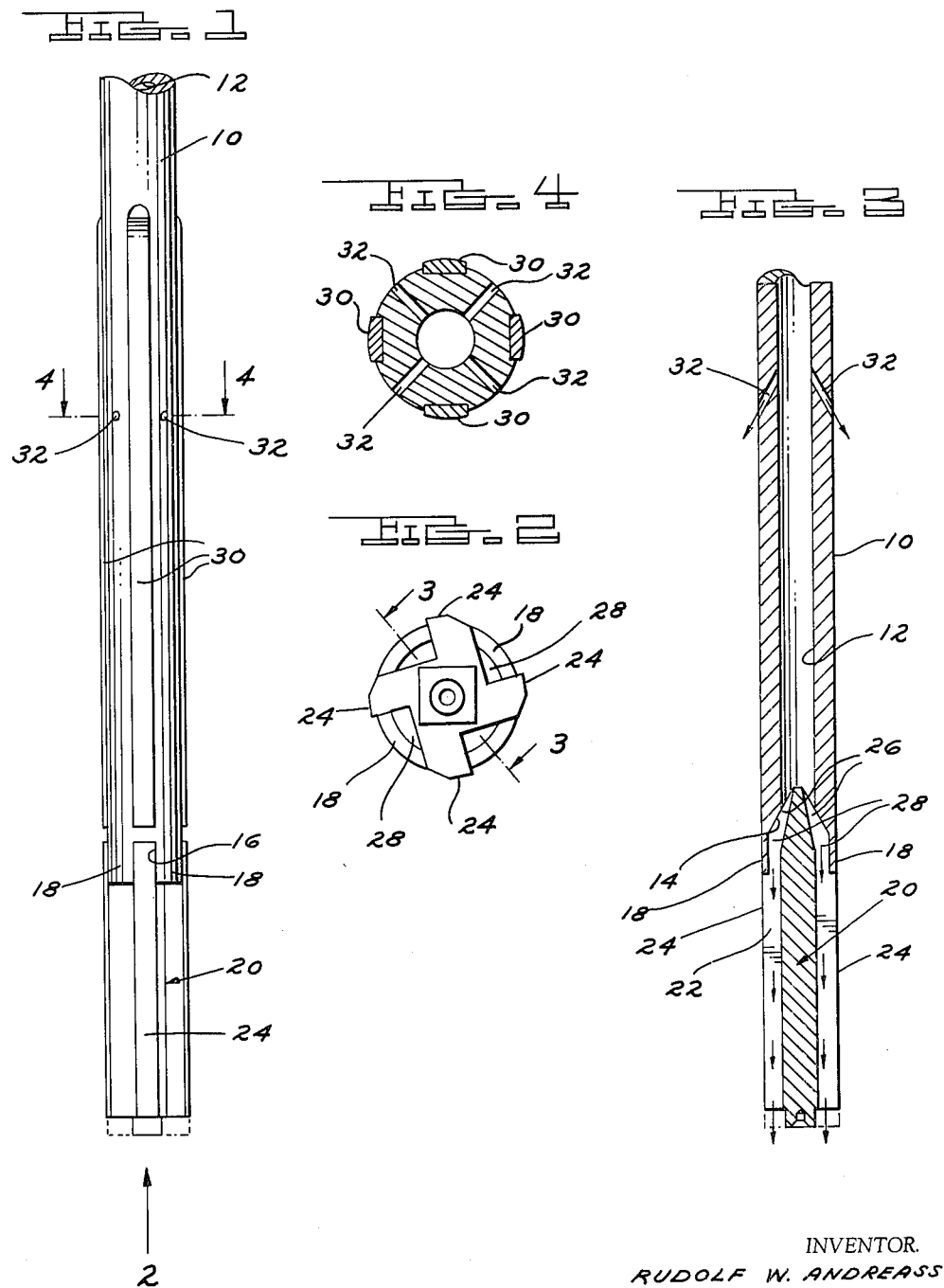

This invention relates to a reamer with a reinforced cooled shank. The reamer is disclosed in general in my Patent No. 3,055,239, dated Sept. 25, 1962, and more specifically in my co-pending application Serial No. 206,972, filed July 2, 1962.

It is an object of the present invention to provide an improved reamer for use with heavy feed loads and for use in certain materials where distortion of the shank in heavy feed may cause rubbing, galling, or burning of the wall surfaces of the hole.

In general, the reamer comprises that type of construction wherein a hollow tube is used as a shank and harder high speed steel, carbide, or other cutting material insert is brazed to the end of the reamer shank. Coolant is provided through the center of the shank and distributed to the flutes of the reamer. In addition, the shank of the reamer has been rigidified above the working end in a manner to create additional fluted area, and coolant has been diverted in small quantity to this area to lubricate and cool without affecting the normal function of the reaming operation.

Other objects and features of the invention relating to details of construction and operation will be apparent in the following description and claim.

Drawings accompany the disclosure and the various views thereof may be briefly described as:

FIGURE 1, a side elevation of a reamer constructed in accordance with the invention.

FIGURE 2, an end view taken at line 2 of FIGURE 1.

FIGURE 3, a longitudinal sectional view of the reamer taken on line 3—3 of FIGURE 2.

FIGURE 4, a sectional view of the reamer shank at line 4—4 of FIGURE 1.

Referring to the drawings:

In FIGURE 1, a shank 10 comprising a steel tube having a center opening 12 is shown, this shank having, at its bottom end, a conical recess 14 and notches 16 in the walls thereof provided to leave spaced skirt portions 18 as extensions of the walls of the tube. A working insert 20 having circumferentially spaced axial flutes 22 has axial lands 24 which project upwardly into the slots 16. The flutes 22 are slanted inwardly at 26 so that the flutes are connected to the center hole 12 of the shank. The interlocking of the lands 24 and the notches 16 provides a strong drive connection between the parts when brazed together. The skirt portions 18 extending down over the straight portions of the flutes 22 at their upper ends form an enclosed channel 28 which dissipates the outward component force of the coolant created by the slanted channel 26 and causes a straight flow of coolant down along the flutes to the lower cutting end.

The shank directly above the reaming insert 20 is of slightly smaller diameter than the effective diameter of the lands 24 and on this shank are placed four circumferentially spaced carbide ribs 30 aligned with the lands 24. These ribs can be brazed directly to the surface of the shank 10 or recessed slightly as shown in FIGURE 4.

About two-thirds of the distance up from the end of the shank, holes 32 are drilled through the walls of the shank upwardly at an angle as shown in FIGURE 3.

The holes 32 are preferably relatively small in diameter compared with the effective area of the passages 26–28 leading from the center of the shank to the cutting flutes. Thus, a small portion of the coolant which is injected at fairly high pressure is diverted to aslant holes 32 while the major portion of it flows down to the end of the passage 12 to the openings 26–28. This diverted portion, however, flows out between the reinforcing ribs or wear strips 30 at a downward angle so that these wear strips are lubricated against the walls of the bore and also cooled. Thus, when the reamer is under heavy load, any tendency for it to bow or bend in the hole by reason of axial pressure or torque will be resisted by the wear strips 30 which not only strengthen the shank but also provide a bearing surface cylindrical in shape as shown in FIGURE 4. Thus, for heavy duty jobs and tough metal, this reinforced shank, which is simultaneously lubricated and cooled both inside and out, provides an improved tool which insures a more accurate reaming operation on the part of the reaming insert 20 itself. This is accomplished without departing from the standard relatively inexpensive shank. It will be noted also that the shank may be used and reused with reground and new reamer inserts.

What I claim is:

A rotary drill assembly utilizing a shank and a separable cutting tool affixed thereto comprising:

(a) a shank in the form of a tube with an internal axial coolant passage, said shank having a plurality of circumferentially spaced axially extending recesses on the outer surface thereof, (b) a plurality of long, narrow wear strips formed of material harder than that of the shank affixed on the outer surface of said shank in said recesses, (c) a cutting tip affixed to one end of said tube in alignment therewith having a plurality of straight axial lands having contact surfaces of slightly greater diameter than said tube and substantially equal to the diameter of the wear strips on said shank and aligned with said wear strips, said tip having flutes formed between said lands extending to the internal coolant passage in said shank, and (d) said shank having radial passages leading outward and downward to the surface of said shank between said wear strips spaced upwardly from the end of the shank to a point near the upper end of said strips, said radial passages being dimensioned to an effective area less than the passages in said tip flutes whereby a small quantity of coolant passing through said shank may divert to the walls of a hole in which said shank is operating, the bulk of the coolant passing to said flutes.

References Cited by the Examiner
UNITED STATES PATENTS

| | | | |
|---|---|---|---|
| 2,882,765 | 4/59 | Andreasson | 77—68 |
| 2,971,409 | 2/61 | Peters et al. | 77—68 |
| 3,055,239 | 9/62 | Andreasson | 77—68 |

WILLIAM W. DYER, JR., *Primary Examiner.*